(12) United States Patent
Ziche et al.

(10) Patent No.: US 6,486,288 B1
(45) Date of Patent: Nov. 26, 2002

(54) CROSSLINKABLE ORGANOPOLYSILOXANE COMPOSITIONS

(75) Inventors: Wolfgang Ziche, Röderau-Bobersen (DE); Susanne Straussberger, Mehring Öd (DE); Klaus Obermeier, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/715,555

(22) Filed: Nov. 17, 2000

(30) Foreign Application Priority Data

Nov. 29, 1999 (DE) .......................................... 199 57 336

(51) Int. Cl.⁷ .............................................. C08G 77/08
(52) U.S. Cl. .......................................... 528/17; 528/34
(58) Field of Search ...................... 528/17, 34

(56) References Cited

U.S. PATENT DOCUMENTS

| | | | |
|---|---|---|---|
| 3,965,280 A | | 6/1976 | Ceyzeriat et al. |
| 4,143,088 A | * | 3/1979 | Favre et al. |
| 4,433,127 A | | 2/1984 | Sugiyama et al. |
| 4,525,565 A | | 6/1985 | Laisney et al. |
| 4,906,719 A | | 3/1990 | Chu et al. |
| 5,428,103 A | | 6/1995 | Friebe et al. |

FOREIGN PATENT DOCUMENTS

| | | |
|---|---|---|
| DE | 42 13 873 A1 | 11/1993 |
| DE | 44 27 528 A1 | 2/1996 |
| EP | 0 747 443 A2 | 12/1996 |
| FR | 73 08143 | 10/1974 |
| FR | 76 08528 | 10/1977 |
| GB | 1040898 | 9/1966 |

OTHER PUBLICATIONS

English Derwent Abstract Corresponding To DE 42 13 873.
English Derwent Abstract Corresponding To DE 44 27 528.

* cited by examiner

Primary Examiner—Margaret G. Moore
(74) Attorney, Agent, or Firm—Brooks & Kushman P.C.

(57) ABSTRACT

Organopolysiloxane compositions which are stable on storage in the absence of moisture and can be crosslinked at room temperature on admission of moisture are based on organosilicon compounds containing at least two hydrolyzable groups, and contain, as catalyst, at least one titanium compound of the formula $$\text{Ti(OR)}_{4-n}[(\text{OR}^1)_x\text{—OR}^2]_n \qquad (I)$$

where

R may be identical or different and are monovalent, substituted or unsubstituted hydrocarbon radicals, $R^1$ may be identical or different and are divalent, substituted or unsubstituted hydrocarbon radicals, $R^2$ may be identical or different and are as defined for R, n is 1, 2, 3 or 4 and x is an integer greater than or equal to 1.

23 Claims, No Drawings

CROSSLINKABLE ORGANOPOLYSILOXANE COMPOSITIONS

TECHNICAL FIELD

The invention relates to organopolysiloxane compositions which are stable on storage in the absence of moisture and can be crosslinked at room temperature on admission of moisture using a titanium catalyst, and to a process for preparing such compositions.

BACKGROUND ART

The use of titanium(IV) compounds, particularly chelated titanates, as condensation catalysts in RTV-1 silicone rubbers is generally known. In RTV-1 compositions, these titanium compounds have the disadvantage that they cause undesirable yellowing of the rubbers and thus make it possible to obtain only pigmented compositions, but no translucent compositions. Numerous methods have therefore been developed for reducing yellowing, for instance additives which suppress yellowing as disclosed in U.S. Pat. No. 4,906,719; the use of phosphatotitanates in RTV isocyanate systems as described in U.S. Pat. No. 4,433,127; the use of specific titanium catalysts which are prepared by reaction of organotitanates with hydroxycarboxylic esters, as known from DE 42 13 873; specific titanium catalysts which are prepared by reaction of organotitanates with a β-dicarbonyl compound and additionally with a citric ester, as disclosed in U.S. Pat. No. 5,428,103; and specific titanates whose organic radicals are derived from monohydric alcohols and diols or dihydroxycarboxylic acids, as described in DE 44 27 528 A.

DISCLOSURE OF INVENTION

The present invention is directed to storage stable, moisture curable compositions employing hydrolyzable organosilicon compounds, and employing as a condensation catalyst, at least one titanium compound of the formula $$Ti(OR)_{4-n}[(OR^1)_x{-}OR^2]_n \quad (I)$$

where

R may be identical or different and are monovalent, substituted or unsubstituted hydrocarbon radicals, $R^1$ may be identical or different and are divalent, substituted or unsubstituted hydrocarbon radicals, $R^2$ may be identical or different and are as defined for R, n is 1, 2, 3 or 4 and x is an integer greater than or equal to 1.

BEST MODE FOR CARRYING OUT THE INVENTION

The invention provides organopolysiloxane compositions which are stable on storage in the absence of moisture and can be crosslinked at room temperature on admission of moisture, these compositions comprising organosilicon compounds containing at least two hydrolyzable groups, and comprising, as a catalyst, at least one titanium compound of the formula $$Ti(OR)_{4-n}[(OR^1)_x{-}OR^2]_n \quad (I)$$

wherein

R may be identical or different and are monovalent, substituted or unsubstituted hydrocarbon radicals, $R^1$ may be identical or different and are divalent, substituted or unsubstituted hydrocarbon radicals, $R^2$ may be identical or different and are as defined for R, n is 1, 2, 3 or 4 and x is an integer greater than or equal to 1.

The compositions of the invention are preferably one-component compositions which vulcanize at room temperature (RTV-1 compositions). Depending on the application, these can be solid or fluid.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl or tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl or cycloheptyl radicals and methylcyclohexyl radical; alkenyl radicals such as the vinyl, 1-propenyl and 2-propenyl radicals; aryl radicals such as the phenyl, naphthyl, anthryl and phenanthryl radicals; alkaryl radicals such as o-, m-, p-tolyl radicals, xylyl radicals and ethylphenyl radicals; and aralkyl radicals such as the benzyl radical, the α-phenylethyl radical and the β-phenylethyl radical.

Examples of substituted radicals R are haloalkyl radicals such as the 3,3,3-trifluoro-n-propyl radical, the 2,2,2,2',2',2'-hexafluoroisopropyl radical and the heptafluoroisopropyl radical, and haloaryl radicals such as the o-, m- and p-chlorophenyl radicals.

The radicals R are preferably unsubstituted or halogen-substituted, monovalent hydrocarbon radicals having from 1 to 18 carbon atoms, most preferably alkyl radicals, in particular the ethyl radical and the isopropyl radical.

Examples of radicals $R^1$ are alkylene radicals such as the methylene, ethylene, propylene, methylethylene and butylene radicals. The radicals $R^1$ are preferably unsubstituted or halogen-substituted, divalent hydrocarbon radicals having from 1 to 4 carbon atoms, particularly preferably the ethylene, methylethylene and butylene radicals, in particular the methylethylene radical and ethylene radical.

Examples of radicals $R^2$ are the examples given for R, with preference being given to alkyl radicals and particular preference being given to ethyl and methyl radicals.

In the above formula, n is preferably 2, 3 or 4, in particular 4, and x is preferably an integer from 2 to 12, more preferably from 2 to 4.

Examples of titanium compounds of the formula (I) used according to the invention are Ti[(OCH$_2$CH$_2$)$_{2-12}$—OCH$_3$]$_4$, Ti[(OCH$_2$CH$_2$)$_{2-12}$—O—CH$_2$CH$_2$CH$_2$CH$_3$]$_4$, Ti[(OCH(CH$_3$)CH$_2$)$_{2-12}$—OCH$_3$]$_4$, Ti[(OCH(CH$_3$)CH$_2$))$_{2-12}$—O—CH$_2$CH$_2$CH$_2$CH$_3$]$_4$, Ti(OEt)$_2$[(OCH$_2$CH$_2$)$_{2-12}$—OCH$_3$]$_2$ and Ti(OiPr)[(OCH$_2$CH$_2$)$_{2-12}$—OCH$_3$]$_3$, where Et is ethyl and iPr is isopropyl, with preference being given to Ti[(OCH$_2$CH$_2$)$_{2-12}$—OCH$_3$]$_4$ and particular preference being given to Ti[(OCH$_2$CH$_2$)$_{2-4}$—OCH$_3$]$_4$.

The titanium compounds of the formula (I) used according to the invention are commercial products or can be prepared by chemical methods known per se, for instance by reaction of Ti(OR)$_4$ with n H[(OR$^1$)$_x$OR$^2$] with elimination of n HOR, where R, $R^1$, $R^2$, n and x are each as defined above. Both Ti(OR)$_4$ and H[(OR$^1$)$_x$OR$^2$] are commercial products or can be prepared by known chemical methods.

The catalysts used according to the invention can also be prepared in situ by direct addition of the starting materials, e.g. oligomeric polyxyalkylated alcohols and tetraorganotitananates $Ti(OR)_4$, to the crosslinkable organopolysiloxane compositions.

In addition to the titanium compounds used according to the invention as condensation catalysts, the compositions of the invention may further comprise all components which have been used hitherto for preparing organopolysiloxane compositions which are stable on storage in the absence of moisture and can be crosslinked at room temperature on admission of moisture. The hydrolyzable groups present in the organosilicon compounds which participate in the crosslinking reaction can be any hydrolyzable groups, for example organyloxy groups, in particular alkoxy radicals such as ethoxy radicals, alkoxyethoxy radicals and methoxy radicals. The organosilicon compounds can have siloxane ($\equiv$Si—O—Si$\equiv$) structures or silocarbane ($\equiv$Si—$R^5$—Si$\equiv$ structures where $R^5$ is a divalent, substituted or unsubstituted hydrocarbon radical), or their copolymers, for instance organosilicon compounds of the formula $(R^3O)_{3-a}R^4{}_aSi—R—[R^4{}_2SiO]_b—R^4{}_2Si—R^5—SiR^4{}_a(OR^3)_{3-a}$, where $R^3$, $R^4$, a and b are as defined for formula (II) below, and $R^5$ is a divalent, substituted or unsubstituted hydrocarbon radical. Reference may be made, for example, to EP 747 443 A2, page 2, lines 42 to 53.

The crosslinkable organopolysiloxane compositions of the invention are preferably ones which comprise
(A) essentially linear diorganopolysiloxanes having at least two organyloxy radicals at each end group,
(B) organyloxy-functional crosslinkers having at least three organyloxy groups and/or their partial hydrolyzates and
(C) titanium compound of the formula (I).

The diorganopolysiloxanes having at least two organyloxy radicals at each end group which are used according to the invention are preferably ones of the formula $$(R^3O)_{3-a}R^4{}_aSiO—[R^4{}_2SiO]_b—SiR^4{}_a(OR^3)_{3-a} \qquad (II),$$

where
a is 0 or 1,
$R^4$ are identical or different SiC-bonded hydrocarbon radicals having from 1 to 18 carbon atoms which may be substituted by halogen atoms, amino groups, ether groups, ester groups, epoxy groups, mercapto groups, cyano groups or (poly)glycol radicals, where the latter are built up of oxyethylene and/or oxypropylene units, and
$R^3$ may be identical or different and are as defined for R,
b is an integer from 10 to 10,000, preferably from 100 to 3000, and more preferably from 400 to 2000.

Examples of radicals $R^3$ and $R^4$ are the examples given above for radical R. The radicals $R^3$ and $R^4$ are preferably, independently of one another, alkyl radicals, more preferably alkyl radicals having from 1 to 4 carbon atoms, in particular methyl radicals.

The average value of b in formula (II) is preferably selected so that the organopolysiloxane of the formula (II) has a viscosity of from 1000 to 2,500,000 mPa·s, more preferably from 4000 to 800,000 mPa·s, in each case measured at a temperature of 25° C.

Although not shown in formula (II) nor deducible from the name diorganopolysiloxane, up to 10 mol percent of the diorganosiloxane units can be replaced by other siloxane units, e.g. $R^4{}_3SiO_{1/2}$, $R^4SiO_{3/2}$ and $SiO_{4/2}$ units, where $R^4$ is as defined above. These organopolysiloxanes are still considered linear as that term is used herein unless indicated otherwise.

Examples of diorganopolysiloxanes having at least two organyloxy radicals at each end group (A) which are used in the compositions of the invention are $(MeO)_2MeSiO[SiMe_2O]_{200-2000}OSiMe(OMe)_2$,
$(EtO)_2MeSiO[SiMe_2O]_{200-2000}OSiMe(OEt)_2$,
$(MeO)_2ViSiO[SiMe_2O]_{200-2000}OSiVi(OMe)_2$,
$(EtO)_2ViSiO[SiMe_2O]_{200-2000}OSiVi(OEt)_2$,
$(MeO)_2CapSiO[SiMe_2O]_{200-2000}OSiCap(OMe)_2$,
$(MeO)_2BapSiO[SiMe_2O]_{200-2000}OSiBap(OMe)_2$ and
$(EtO)_2BapSiO[SiMe_2O]_{200-2000}OSiBap(OEt)_2$.

Further examples of organosilicon compounds which can be used for preparing the compositions of the invention are $(MeO)_2MeSi—CH_2CH_2—[SiMe_2O]_{200-2000}SiMe—CH_2CH_2—SiMe(OMe)_2$ and $(EtO)_2MeSi—CH_2CH_2—[SiMe_2O]_{200-2000}SiMe—CH_2CH_2—SiMe(OEt)_2$, where Me is the methyl radical, Et is the ethyl radical, Vi is the vinyl radical, Cap is the 3-(cyclohexylamino)propyl radical and Bap is the 3-(n-butylamino)propyl radical.

The organosilicon compounds having at least two organyloxy radicals at each end group which are used in the compositions of the invention are commercial products or can be prepared by methods known in silicon chemistry, for example by reaction of α,ω-dihydroxypolyorganosiloxanes with the appropriate organyloxysilanes.

The organyloxy-functional crosslinkers (B) used in the compositions of the invention can be any organyloxy crosslinkers known hitherto, for example silanes or siloxanes having at least three organyloxy groups. The organyloxy crosslinkers (B) used in the compositions of the invention are preferably organosilicon compounds of the formula $$(R^3O)_{4-c}SiR^6{}_c \qquad (III),$$

where
$R^3$ may be identical or different and are as defined above,
$R^6$ is as defined for $R^4$ and
c is 0 or 1,
and their partial hydrolyzates.

The partial hydrolyzates can be partial homohydrolyzates, i.e. partial hydrolyzates of one type of organosilicon compound of the formula (III), or partial cohydrolyzates, i.e. partial hydrolyzates of at least two different types of organosilicon compounds of the formula (III). If the crosslinkers (B) which may be used in the compositions of the invention are partial hydrolyzates of organosilicon compounds of the formula (III), preference is given to ones having up to 6 silicon atoms.

Examples of radicals $R^6$ are the examples given above for radical R, with preference being given to hydrocarbon radicals having from 1 to 12 carbon atoms and particular preference being given to the methyl radical and the vinyl radical.

The crosslinkers (B) used in the compositions of the invention are particularly preferably tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 3-aminopropyltrimethoxysilane, 3-aminopropyltriethoxysilane, 3-cyanopropyltrimethoxysilane, 3-cyanopropyltriethoxysilane, 3-(2-aminoethylamino)propyltrimethoxysilane, 3-(2-aminoethylamino)propyltriethoxysilane, 3-(N,N-diethyl-2-aminoethylamino)propyltrimethoxysilane, 3-(N,N-diethyl2-aminoethylamino)propyltriethoxysilane, 3-(cyclohexylamino)

propyltrimethoxysilane, 3-(cyclohexylamino) propyltriethoxysilane, 3-(glycidoxy)propyltriethoxysilane, 1,2-bis(trimethoxysilyl)ethane, 1,2-bis(triethoxysilyl)ethane and partial hydrolyzates of the alkoxy-functional organosilicon compounds mentioned, for example hexaethoxydisiloxane.

The crosslinkers (B) used in the compositions of the invention are commercial products or can be prepared by methods known in silicon chemistry.

The compositions of the invention contain crosslinkers (B) in amounts of preferably from 0.01 to 20 parts by weight, more preferably from 0.5 to 10 parts by weight, and in particular from 1.0 to 5.0 parts by weight, in each case based on 100 parts by weight of organopolysiloxane (A).

The compositions of the invention contain the condensation catalyst (C) in amounts of preferably from 0.01 to 10.0 parts by weight, more preferably from 0.1 to 10.0 parts by weight, and in particular from 0.5 to 5.0 parts by weight, in each case based on 100 parts by weight of organopolysiloxane (A).

In addition to the above-described components (A), (B) and (C), the compositions of the invention may further comprise other materials such as plasticizers (D), fillers (E), bonding agents (F) and additives (G), where the additional materials (D) to (G) may be the same ones as have previously been used in compositions which are stable on storage in the absence of moisture and can be crosslinked on admission of moisture.

Examples of plasticizers (D) are dimethylpolysiloxanes which are liquid at room temperature and have trimethylsiloxy end groups, particularly ones having viscosities in the range from 50 to 1000 mPa·s, and also high-boiling hydrocarbons, for example paraffin oils.

The compositions of the invention contain plasticizers (D) in amounts of preferably from 0 to 300 parts by weight, more preferably from 10 to 200 parts by weight, and in particular from 20 to 100 parts by weight, in each case based on 100 parts by weight of organopolysiloxane (A).

Examples of fillers (E) are nonreinforcing fillers, i.e. fillers having a BET surface area of up to 50 $m^2/g$, e.g. quartz, diatomaceous earth, calcium silicate, zirconium silicate, zeolites, metal oxide powders such as aluminum, titanium, iron or zinc oxides or their mixed oxides, barium sulfate, calcium carbonate, gypsum, silicon nitride, silicon carbide, boron nitride, glass and polymer powders, e.g. polyacrylonitrile powder; reinforcing fillers, i.e. fillers having a BET surface area of more than 50 $m^2/g$, e.g. pyrogenic silica, precipitated silica, precipitated chalk, carbon black, e.g. furnace and acetylene black, and siliconaluminum mixed oxides having a large BET surface area; and fibrous fillers such as asbestos and polymer fibers. The fillers mentioned may have been hydrophobicized, for example by treatment with organosilanes or organosiloxanes or with stearic acid or by etherification of hydroxyl groups to form alkoxy groups. If fillers (E) are used, they are preferably hydrophilic pyrogenic silica or chalk coated with stearic acid.

The compositions of the invention contain fillers (E) in amounts of preferably from 0 to 300 parts by weight, more preferably from 1 to 200 parts by weight, and in particular from 5 to 200 parts by weight, in each case based on 100 parts by weight of organopolysiloxane (A).

Examples of bonding agents (F) used in the organopolysiloxane compositions of the invention are silanes and organopolysiloxanes containing functional groups, for example those containing aminoalkyl, glycidoxypropyl or methacryloxypropyl radicals, and also tetraalkoxysilanes.

However, if another component, e.g. siloxane (A) or crosslinker (B), already has the abovementioned functional groups, the addition of bonding agents can generally be omitted. The compositions of the invention contain bonding agents (F) in amounts of preferably from 0 to 50 parts by weight, more preferably from 1 to 20 parts by weight, and in particular from 1 to 10 parts by weight, in each case based on 100 parts by weight of organopolysiloxane (A).

Examples of additives (G) are pigments, dyes, fragrances, fungicides, oxidation inhibitors, agents for influencing the electrical properties, e.g. conductive carbon black, flame retardants, light stabilizers and agents for increasing the skin formation time, e.g. silanes having an SiC-bonded mercaptoalkyl radical, cell-producing agents, e.g. azodicarbonamide, heat stabilizers, and thixotropes, for example phosphoric esters, and organic solvents such as alkyl aromatics.

The compositions of the invention preferably contain additives (G) in amounts of from 0 to 100 parts by weight, more preferably from 0 to 30 parts by weight, and in particular from 0 to 10 parts by weight, in each case based on 100 parts by weight of organopolysiloxane (A).

The compositions of the invention are preferably compositions which comprise (A) a diorganopolysiloxane of the formula (II), (B) crosslinkers of the formula (III) and/or their partial hydrolyzates, (C) a titanium compound of the formula (I), and (D) fillers.

Most preferably, the compositions of the invention are ones consisting of (A) 100 parts by weight of polydiorganosiloxane of the formula (II), (B) from 1.0 to 5.0 parts by weight of crosslinkers of the formula (III) and/or their partial hydrolyzates, (C) from 0.5 to 5.0 parts by weight of titanium compound of the formula (I), (D) from 0 to 300 parts by weight of plasticizer, (E) from 0 to 300 parts by weight of filler, (F) from 0 to 50 parts by weight of bonding agent and (G) from 0 to 100 parts by weight of other additives.

Each of the individual components of the compositions of the invention can be one type of such a component or a mixture of at least two different types of such components.

To prepare the compositions of the invention, all constituents of the respective compositions can be mixed with one another in any order. This mixing can be carried out at room temperature and at the pressure of the surrounding atmosphere, i.e. from about 900 to 1100 hPa. However, if desired, this mixing can also be carried out at higher temperatures, e.g. at temperatures in the range from 35° C. to 135° C.

The preparation and storage of the organopolysiloxane compositions of the invention has to be carried out under essentially water-free conditions, since otherwise the compositions can cure prematurely.

The usual water content of air is sufficient for crosslinking the compositions of the invention to give elastomers. Crosslinking can, if desired, also be carried out at temperatures which are higher or lower than room temperature, e.g. at from −5° to 15° C. or at from 30° to 50° C. Crosslinking is preferably carried out at a pressure of from 100 to 1100 hPa, in particular, at ambient atmospheric pressure.

The present invention further provides shaped bodies produced by crosslinking the compositions of the invention.

The crosslinkable organopolysiloxane compositions of the invention have the advantage that they have a very high storage stability and a high crosslinking rate. In addition, the organopolysiloxane compositions of the invention have the advantage that the use of titanium compounds of the formula (I) gives colorless, translucent materials. Another advantage of the compositions of the invention is the wide variability and availability of the ligands used in the titanium compound of the formula (I), which allow the vulcanization rate to be controlled via the chain length of the ligands. The larger the value of x in formula (I), the longer the vulcanization times obtained.

The compositions of the invention can be used for all applications for which organopolysiloxane compositions which are stable on storage in the absence of water and which crosslink at room temperature on admission of water to give elastomers, can be used.

The compositions of the invention are thus outstandingly suitable, for example, as sealing compositions for joints, including joints which run vertically, and similar voids having a width of, for example, from 10 to 40 mm, e.g. in buildings, terrestrial vehicles, watercraft and aircraft, or as adhesives or putties, e.g. in window construction or in the production of aquaria or showcases, and also, for example, for producing protective coatings, including those for surfaces which are continually exposed to fresh water or seawater, antislip coatings, or for producing rubber-elastic shaped bodies. The compositions are also suitable for the insulation of electric or electronic equipment.

In the examples described below, all reported viscosities are at a temperature of 25° C. Unless indicated otherwise, the examples are carried out at ambient atmospheric pressure, i.e. at about 1000 hPa, at room temperature, i.e. at about 23° C., or at the temperature which is established on combining the reactants at room temperature without additional heating or cooling, and at a relative atmospheric humidity of about 50%. In addition, all reported parts and percentages are, unless otherwise indicated, parts or percentages by weight.

The tear propagation resistance of vulcanizates is determined accordance with ISO 34, method C. Shore A hardness is determined in accordance with DIN (Deutsche Industrie Norm=German Industrial Standard) 53505-87. Tensile strength is determined in accordance with DIN 53504-85-S1. Elongation at break is determined in accordance with DIN 53504-85-S1. Stress at 100% elongation is measured in accordance with DIN 53504-S1.

EXAMPLE 1 (E1)

Catalyst Synthesis (C1): Tetraethoxytitanium is heated with four equivalents of diethylene glycol monomethyl ether while stirring, until four equivalents of ethanol have been distilled off. The product is obtained quantitatively in good purity ($^1$H-NMR). The synthesis of the catalysts (C2), (C3) and (C4) is carried out in an analogous manner.

(C1): Ti(O—CH$_2$CH$_2$—O—CH$_2$CH$_2$—O—CH$_3$)$_4$; pale yellow liquid; M=524.

$^1$H-NMR (C$_6$D$_6$): δ[ppm] 3.22 (s, 12 H, O—CH$_3$), 3.51, 3.70, 3.77 (tr, 7 Hz, 8 H, CH$_2$), 4.6 (s, br, 8 H, CH$_2$). IR (NaCl): 805 m, 937 m, 1037 s, 1107 vs, 1199 s, 1244 m, 1350 m, 1454 m, 2875 vs, 3464 w.

(C2): Ti[(OCH$_2$CH$_2$)$_x$—O—CH$_3$]$_4$ where x≈7; pale yellow, viscous liquid; M=1440.

(C3): Ti[(OCH$_2$CH$_2$)$_x$—O—CH$_3$]$_4$ where x≈12; pale yellow amorphous solid, melting point=45° C.; M=2240.

(C4): Ti[(OCH(CH$_3$)CH$_2$)$_x$—O—CH$_3$]$_4$ where x≈5; pale yellow, viscous liquid.

In a planetary mixer with provision for vacuum operation, 55.0 parts by weight of a polydimethylsiloxane having —OSi(OCH$_3$)$_2$CH$_3$ end groups and a viscosity of 80,000 m·Pas are mixed, in the absence of moisture, with 31.0 parts by weight of a polydimethylsiloxane having —OSi(CH$_3$)$_3$ end groups and a viscosity of 100 m·Pas, and 4.0 parts by weight of methyltrimethoxysilane. 8.0 parts by weight of pyrogenic silica having a BET surface of 150 m$^2$/g are then mixed in, followed by 2.6 mmol of the respective titanium catalyst per 150 g of RTV-1 composition.

After homogenization under vacuum, the composition is dispensed into moisture-tight containers and stored at room temperature for the first 24 hours, and stored subsequently at 50° C. After the storage time indicated in Table 1, the skin formation time is determined with the aid of beads (SFT: time for formation of a dry surface of the bead). The catalysts used in each case and the results obtained are shown in Table 1. In the table, minutes are abbreviated "m", while hours are abbreviated "h".

The time to achieve complete vulcanization of a composition containing catalyst C1 was less than 7 days for a 13 mm thick layer.

TABLE 1

| Example | Catalyst | Storage [h] | SFT | Appearance |
| --- | --- | --- | --- | --- |
| E1a | C1 | 24 | 20 min | translucent, colorless |
| | | 168 | 35 min | translucent, colorless |
| | | 336 | 28 min | translucent, colorless |
| E1b | C2 | 24 | 80 min | milky, colorless |
| | | 168 | 80 min | milky, colorless |
| | | 336 | 80 min | milky, colorless |
| E1c | C3 | 24 | 3 h | milky, colorless |
| | | 168 | 3 h | milky, colorless |
| | | 336 | 3 h | milky, colorless |
| E1d | C4 | 24 | 35 min | translucent, colorless |
| | | 168 | 40 min | translucent, colorless |
| | | 336 | 50 min | translucent, colorless |
| | | 672 | 45 min | translucent, colorless |
| | | 1680 | 30 min | translucent, colorless |

The vulcanization rate, measured by the skin formation time (SFT), can be controlled via the length of the oligoalkylene oxide chain (x in formula (I)). All compositions and vulcanizates remain colorless and are stable on storage.

Comparative Example 1

The procedure described in Example 1 is repeated except that diisopropoxybis(ethylacetoacetato) titanium commercially available under the trade name TYZOR® DC from DuPont, is used instead of the catalysts C1–C4. The vulcanization of the RTV composition is good, but the composition has a distinctly yellow color.

EXAMPLE 2 (E2)

In a planetary mixer with vacuum capability, 60.4 parts by weight of a polydimethylsiloxane having —OSi(OCH$_3$)$_2$CH$_3$ end groups and a viscosity of 80,000 mPa·s are mixed, in the absence of water, with 24.2 parts by weight of a polydimethylsiloxane having —OSi(CH$_3$)$_3$ end groups and a viscosity of 100 mPa·s, 2.0 parts by weight of vinyltrimethoxysilane, and 1.5 parts by weight of methyltrimethoxysilane. 8.5 parts by weight of pyrogenic silica having a BET surface area of 150 m$^2$/g are then mixed in, and the composition obtained in this way is finally admixed with 1.9 parts by weight of the titanium catalyst C1, whose preparation is described in Example E1. After homogenization under vacuum, the composition is dispensed into moisture-tight containers and stored at room temperature for the first 672 hours (4 weeks) and subsequently at 50° C. for 1344 hours (8 weeks). After the respective storage times, the skin formation times are determined with the aid of beads. All skin formation times determined are in the range from 25 to 35 minutes, and vulcanization continues to be good. The crosslinkable composition and the vulcanizates are colorless.

The mechanical properties of the vulcanizate derived from the composition which has been stored for 168 hours at room temperature are determined. The results are shown in Table 2.

Comparative Example 2 (CE2)

In a planetary mixer with vacuum capability, 62.1 parts by weight of a polydimethylsiloxane having —OSi(OCH$_3$)$_2$CH$_3$ end groups and a viscosity of 80,000 mPa·s are mixed, in the absence of water, with 28.6 parts by weight of a polydimethylsiloxane having —OSi(CH$_3$)$_3$ end groups (viscosity 100 mPa·s), 1.75 parts by weight of vinyltrimethoxysilane, and 1.75 parts by weight of methyltrimethoxysilane. 8.5 parts by weight of pyrogenic silica having a BET surface area of 150 m$^2$/g are then mixed in, and finally, 0.3 part by weight of a tin condensation catalyst obtained from the reaction of dibutyltin diacetate with tetraethyl silicate is added. After homogenization under vacuum, the composition is dispensed into moisture-tight containers. 24 hours after the preparation, the skin formation time is determined with the aid of beads. The crosslinkable composition and the vulcanizate are colorless. The mechanical properties of the vulcanizate are determined. The results are shown in Table 2. After storage for one week at 50° C., the composition no longer vulcanizes.

EXAMPLE 3 (E3)

In a planetary mixer with vacuum capability, 36.5 parts by weight of a polydimethylsiloxane having —OSi(OCH$_3$)$_2$CH$_3$ end groups and a viscosity of 80,000 mPa·s are mixed in the absence of water with 18.0 parts by weight of a polydimethylsiloxane having —OSi(CH$_3$)$_3$ end groups and a viscosity of 100 mPa·s, 2.0 parts by weight of vinyltrimethoxysilane, and 1.5 parts by weight of methyltrimethoxysilane. 5.5 parts by weight of pyrogenic silica having a BET surface area of 150 m$^2$/g and 35.0 parts by weight of chalk (commercially available under the trade name Omya BLR3 from Omya GmbH, Germany) are then mixed in and the composition is subsequently admixed with 1.9 parts by weight of the titanium catalyst C1 whose preparation is described in Example E1. After homogenization under vacuum, the composition is dispensed into moisture-tight containers and stored at room temperature for the first 672 hours (4 weeks) and subsequently at 50° C. for 1344 hours (8 weeks). After the respective storage times, the skin formation times are determined with the aid of beads. All skin formation times determined are in the range from 25 to 35 minutes, and the vulcanization continues to be good. The crosslinkable composition and the vulcanizates display the slight beige color of the chalk filler.

The mechanical properties of the vulcanizate derived from the composition which has been stored for 168 hours at room temperature are determined. The results are shown in Table 2.

Comparative Example 3 (CE3)

The procedure described in Example 3 is repeated except that the catalyst C1 is replaced by the equivalent amount of diisopropoxybis (ethyl acetoacetato) titanium, commercially available under the trade name TYZOR® DC from DuPont. The composition and the vulcanizates have a distinctly yellow color. The mechanical properties of the vulcanizate are shown in Table 2.

TABLE 2

| Example | E2 | CE2 | E3 | CE3 |
|---|---|---|---|---|
| Tensile strength [N/mm$^2$] | 1.2 | 1.1 | 1.6 | 1.3 |
| Elongation at break [%] | 650 | 540 | 660 | 730 |
| Stress at 100% elongation [MPa] | 0.3 | 0.25 | 0.20 | 0.32 |
| Tear propagation resistance [Mpa] | 5.4 | 3.4 | 5.2 | 3.9 |
| Shore A hardness | 21 | 14 | 14 | 17 |

The catalyst C1 used according to the invention allows the production of vulcanizates having good mechanical properties.

Comparative Example 4

The procedure described in Comparative Example 3 is repeated except that the diisopropoxybis (ethylacetoacetato) titanium is replaced by the equivalent amount of a catalyst prepared from isopropoxy-n-butoxybis (acetylacetonato) titanium, commercially available under the trade name TYZOR® AA-95 from DuPont, and two parts of diethylene glycol monomethyl ether, with removal of low-boiling alcohols by distillation. The composition and the vulcanizates have a distinctly yellow color.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A crosslinkable organopolysiloxane composition which is stable on storage in the absence of moisture and can be crosslinked at room temperature on admission of moisture, comprising at least one substantially linear organopolysiloxane compound containing at least two hydrolyzable groups, and at least one titanium compound catalyst of the formula $$\mathrm{Ti(OR)}_{4-n}[(\mathrm{OR}^1)_x\mathrm{—OR}^2]_n \qquad (I)$$

where
R are identical or different and are monovalent, substituted or unsubstituted hydrocarbon radicals,
R$^1$ are identical or different and are divalent, substituted or unsubstituted hydrocarbon radicals,
R$^2$ are identical or different and are as defined for R,
n is 1, 2, 3 or 4 and
x is an integer greater than or equal to 1,
wherein said at least two hydrolyzable groups comprise organyloxy groups.

2. The crosslinkable organopolysiloxane composition of claim 1, comprising
(A) at least one substantially linear diorganopolysiloxane having at least two organyloxy radicals at each terminus.
(B) at least one organyloxy-functional crosslinker having at least three organyloxy groups and/or their partial hydrolyzates, and
(C) at least one titanium compound of the formula (I).

3. The crosslinkable organopolysiloxane composition of claim 1, comprising
(A) at least one diorganopolysiloxane of the formula (II),

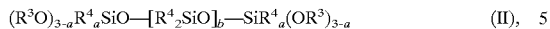

$(R^3O)_{3-a}R^4_a SiO—[R^4_2SiO]_b—SiR^4_a(OR^3)_{3-a}$ (II), where
a is 0 or 1,
$R^4$ are identical or different SiC-bonded hydrocarbon radicals having from 1 to 18 carbon atoms which may be substituted by halogen atoms, amino groups, ether groups, ester groups, epoxy groups, mercapto groups, cyano groups or (poly)glycol radicals, where the latter are built up of oxyethylene and/or oxypropylene units, and
$R^3$ may be identical or different and are as defined for R,
b is an integer from 10 to 10,000;
(B) at least one crosslinker of the formula (III) and/or their partial hydrolyzates,

$(R^3O)_{4-c}SiR^6_c$ (III), where
$R^3$ are identical or different and are as defined above,
$R^6$ are as defined for $R^4$ and
c is 0 or 1,
and their partial hydrolyzates;
(C) at least one titanium compound of the formula (I); and
(E) fillers.

4. The crosslinkable organopolysiloxane composition of claim 1, comprising
(A) at least one diorganopolysiloxane of the formula (II),

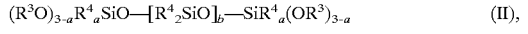

$(R^3O)_{3-a}R^4_a SiO—[R^4_2SiO]_b—SiR^4_a(OR^3)_{3-a}$ (II), where
a is 0 or 1,
$R^4$ are identical or different SiC-bonded hydrocarbon radicals having from 1 to 18 carbon atoms which may be substituted by halogen atoms, amino groups, ether groups, ester groups, epoxy groups, mercapto groups, cyano groups or (poly)glycol radicals, where the latter are built up of oxyethylene and/or oxypropylene units, and
$R^3$ may be identical or different and are as defined for R,
b is an integer from 100 to 3000;
(B) at least one crosslinker of the formula (III) and/or their partial hydrolyzates,

$(R^3O)_{4-c}SiR^6_c$ (III), where
$R^3$ are identical or different and are as defined above,
$R^6$ are as defined for $R^4$ and
c is 0 or 1,
and their partial hydrolyzates;
(C) at least one titanium compound of the formula (I); and
(E) fillers.

5. A crosslinkable composition as claimed in claim 3, consisting essentially of
(A) 100 parts by weight of polydiorganosiloxane of the formula (II),
(B) from 1.0 to 5.0 parts by weight of crosslinkers of the formula (III) and/or their partial hydrolyzates,
(C) from 0.5 to 5.0 parts by weight of titanium compound of the formula (I),
(D) from 0 to 300 parts by weight of plasticizers,
(E) from 0 to 300 parts by weight of fillers,
(F) from 0 to 50 parts by weight of bonding agents, and
(G) from 0 to 100 parts by weight of additives.

6. A crosslinkable composition as claimed in claim 4, consisting essentially of
(A) 100 parts by weight of polydiorganosiloxane of the formula (II),
(B) from 1.0 to 5.0 parts by weight of crosslinkers of the formula (III) and/or their partial hydrolyzates,
(C) from 0.5 to 5.0 parts by weight of titanium compound of the formula (I),
(D) from 0 to 300 parts by weight of plasticizers,
(E) from 0 to 300 parts by weight of fillers,
(F) from 0 to 50 parts by weight of bonding agents, and
(G) from 0 to 100 parts by weight of additives.

7. The crosslinkable organopolysiloxane composition of claim 1, wherein n is 4.
8. The crosslinkable organopolysiloxane composition of claim 2, wherein n is 4.
9. The crosslinkable organopolysiloxane composition of claim 3, wherein n is 4.
10. The crosslinkable organopolysiloxane composition of claim 4, wherein n is 4.
11. The crosslinkable organopolysiloxane composition of claim 5, wherein n is 4.
12. The crosslinkable organopolysiloxane composition of claim 6, wherein n is 4.
13. A shaped body produced by crosslinking the composition of claim 1.
14. A shaped body produced by crosslinking the composition of claim 2.
15. A shaped body produced by crosslinking the composition of claim 3.
16. A shaped body produced by crosslinking the composition of claim 4.
17. A shaped body produced by crosslinking the composition of claim 5.
18. A shaped body produced by crosslinking the composition of claim 6.
19. A shaped body produced by crosslinking the composition of claim 7.
20. The composition of claim 1, wherein x is from 2 to 12.
21. The composition of claim 1, wherein x is from 2 to 4.
22. The composition of claim 21, wherein n is 4.
23. The composition of claim 1, wherein n is 2 or 3.

* * * * *

UNITED STATES PATENT AND TRADEMARK OFFICE
CERTIFICATE OF CORRECTION

PATENT NO. : 6,486,288 B1
DATED : November 26, 2002
INVENTOR(S) : Wolfgang Ziche et al.

It is certified that error appears in the above-identified patent and that said Letters Patent is hereby corrected as shown below:

Column 11,
Line 16, please delete "defmd" and insert therefor -- defined --;
Line 46, please delete "defmd" and insert therefor -- defined --.

Signed and Sealed this

Twenty-fifth Day of March, 2003

JAMES E. ROGAN
*Director of the United States Patent and Trademark Office*